US008341252B2

(12) United States Patent
Colosi et al.

(10) Patent No.: US 8,341,252 B2
(45) Date of Patent: Dec. 25, 2012

(54) INTERNET DOMAIN NAME SUPER VARIANTS

(75) Inventors: John Colosi, Dulles, VA (US); Srikanth Veeramachaneni, South Riding, VA (US)

(73) Assignee: VeriSign, Inc., Mountain View, CA (US)

(*) Notice: Subject to any disclaimer, the term of this patent is extended or adjusted under 35 U.S.C. 154(b) by 135 days.

(21) Appl. No.: 12/609,794

(22) Filed: Oct. 30, 2009

(65) Prior Publication Data

US 2011/0106924 A1     May 5, 2011

(51) Int. Cl.
    *G06F 15/177*     (2006.01)
(52) U.S. Cl. ................ 709/222; 709/203; 709/245
(58) Field of Classification Search ............... 709/203, 709/222, 245
See application file for complete search history.

(56) References Cited

U.S. PATENT DOCUMENTS

| | | | | |
|---|---|---|---|---|
| 5,164,900 | A * | 11/1992 | Bernath | 715/264 |
| 5,386,559 | A * | 1/1995 | Eisenberg et al. | 707/695 |
| 5,793,381 | A * | 8/1998 | Edberg et al. | 345/467 |
| 6,182,148 | B1 * | 1/2001 | Tout | 709/245 |
| 6,446,133 | B1 * | 9/2002 | Tan et al. | 709/245 |
| 6,829,653 | B1 * | 12/2004 | Tout | 709/245 |
| 7,020,602 | B1 * | 3/2006 | Kim et al. | 704/8 |
| 7,774,432 | B2 * | 8/2010 | Cartmell et al. | 709/219 |
| 2001/0019329 | A1 * | 9/2001 | Kobayashi | 345/467 |
| 2001/0025320 | A1 | 9/2001 | Seng et al. | |
| 2001/0047429 | A1 * | 11/2001 | Seng et al. | 709/245 |
| 2002/0040293 | A1 | 4/2002 | Lee | |
| 2002/0083029 | A1 | 6/2002 | Chun et al. | |
| 2003/0115040 | A1 * | 6/2003 | Xing | 704/8 |
| 2003/0166403 | A1 * | 9/2003 | Hammer et al. | 455/445 |
| 2004/0015584 | A1 * | 1/2004 | Cartmell et al. | 709/225 |
| 2004/0044791 | A1 * | 3/2004 | Pouzzner | 709/245 |
| 2005/0010392 | A1 | 1/2005 | Chen et al. | |
| 2005/0027547 | A1 * | 2/2005 | Chen et al. | 705/1 |
| 2005/0267968 | A1 * | 12/2005 | Fearing et al. | 709/224 |
| 2008/0320167 | A1 * | 12/2008 | Collignon | 709/245 |
| 2010/0106481 | A1 * | 4/2010 | Lo | 704/2 |

OTHER PUBLICATIONS

Internationalized Domain Names for Applications (IDNA): Background, Explanation, and Rationale, IETF Mar. 9, 2009.
RFC 3743—Jet Guidelines for IDN Registration and Administration for Chinese, Japanese, and Korean, IETF Apr. 2004.

(Continued)

*Primary Examiner* — Duyen Doan
(74) *Attorney, Agent, or Firm* — MH2 Technology Law Group, LLP

(57) ABSTRACT

Systems and methods for registering a domain, including Internationalized Domain Names (IDNs), including receiving a request to register an IDN and determining a language category of the request. Code points of the request are converted to yield a generalized variant of the IDN. The generalized variant is compared to a stored database of registered IDNs that may include similar generalized variants of the registered IDNs. Based on the comparison, it is determined whether or not to resister the IDN. In the case the that IDN registration is allowed, the generalized variant of the IDN may be stored in the database to protect against later registration by similar IDNs. Converting the code points of the request may include identifying corresponding code points of variants within the language category, and converting each of the code points of the requested IDN based on a deterministic algorithm applied to the corresponding code points. The deterministic algorithm may be applied to a value of each of the corresponding code points to yield a representative code point from among the corresponding code points, and the generalized variant may include a representative code point for each of the code points of the request.

21 Claims, 4 Drawing Sheets

OTHER PUBLICATIONS

RFC—4290: Suggested Practices for Registration of Internationalized Domain Names (IDN), Dec. 2005.
Internationalized Domain Names for Applications (IDNA): Protocol, IETF Mar. 9, 2009.
Notification of Transmittal of the International Search Report and the Written Opinion of the International Searching Authority dated Dec. 17, 2010, in corresponding International Application No. PCT/US2010/54389 (8 pages).

* cited by examiner

INTERNET DOMAIN NAME SUPER VARIANTS

BACKGROUND OF THE INVENTION

The Domain Name System (DNS) is the part of the Internet infrastructure that translates human-readable domain names into the Internet Protocol (IP) numbers needed to establish TCP/IP communication over the Internet. That is, DNS allows users to refer to web sites, and other resources, using easier to remember domain names, such as "www.example.com", rather than the numeric IP addresses, such as "123.4.56.78", assigned to computers on the Internet. Each domain name is made up of a series of character strings (labels) separated by dots. The right-most label in a domain name is known as the "top-level domain" (TLD). Examples of well-known TLDs are ".com": ".net"; ".org." etc.

The responsibility for operating each TLD (including maintaining a registry of the second-level domains within the TLD) is delegated to a particular organization, known as a domain name registry ("registry"). The registry is primarily responsible for converting domain names to IP addresses ("resolving") through DNS servers that maintain such information in large databases, and operating its top-level domain. Significantly, the original DNS was specified in the era of ASCII, and thus relied on Latin alphabet and numerical characters for domain names. However, as an increasing portion of the Internet users worldwide are speakers of languages that do not use the Latin alphabet, the introduction of Internationalized Domain Names (IDNs) was initiated as a way for these users to navigate the Internet in their own language. IDNs are domain names, or Web addresses, represented by local language characters. The local language domain name may be followed by .com or .net (for example, 网域.com). IDNs utilize non-ASCII characters and are for use in markets where English is not the primary language. They give users a convenient mechanism for accessing Web sites in more than 350 languages.

Because the DNS does not inherently support characters from non-English scripts, international-language names to be registered must be converted into an encoded sequence of supported characters. A standardized methodology has been adopted including the Internet Architecture Board (IAB) principle of a single DNS root and standards developed by the IDN Working Group of the Internet Engineering Task Force (IETF), which uses pre-pending codes to the domain name to apply appropriate code translation rules to the ASCII Compatible Encoding ("ACE"). A brief summary of an IDN methodology is described below.

Consider the domain name 网域.com, for example.

The internationalized portion, 网域, becomes "3b7vcv67."

To complete the registration for the IDN, a two character extension, known as a prepend, and two hyphens ("–") are added by the registrar to flag the domain name as an IDN. The prepend is "xn.". Thus the registration in this example is sent to the registry as "xn—3b7vev67.com." This representation is referred to as the domain name's ACE (ASCII Compatible Encoding) representation.

As detailed above, the IDNs in the Shared Registration System rely on standardized translations of foreign characters to ACE format. However, in foreign languages such as traditional and simplified Chinese, there may be different forms of a character. In light of this complexity, words or characters can take different forms before and after translation. That is words that should be treated identically for purposes of registration and resolution may have different variants and Unicode representations. This can lead to problems in domain name registration and resolution, including the potential of allowing different users to register what should be considered the same domain name by using different forms of the characters.

One solution to the multiple character problem is to block all language-equivalent IDN names for a single registration. This approach allows a single form of the Chinese IDN, but blocks all other forms from later registration. This solution has been recognized by the IDN Working Group of the IETF, which has defined an "IDL Package" as part of the JET Guidelines for IDN. However, because a single Chinese character can have many variants, domain names including several Chinese characters together can result in an overwhelming number of possible variants for a single domain name. Without a special approach the storage required to effectively block IDN names of significant length in Chinese language variants Can be prohibitive. Similar ways of dealing with this problem include other types of reserving or registering all potential variants of an IDN, which can present significant burdens as well. Known methods are also limited in their ability to interpret IDNs that may include different types of character variations within a name. For example, a user may attempt to register or resolve an IDN by inputting a mixture of traditional and simplified Chinese characters that a registration or resolution system may NI to adequately decipher when listed together.

SUMMARY OF THE INVENTION

The present subject matter can provide benefits in improving the registration of domain names, including for example IDNs. Aspects of the disclosed invention provide ways of dealing with problems related to multiple character representation and variation in ways that known systems do not address, and without the onerous requirements of conventional solutions. Aspects of the disclosed invention may employ methods of simplifying the IDN using generalized representations, or "Super Variants", of the IDN. The generalized representations may be stored in a database, such as a registry database, and used to deconflict registration of requested IDNs by comparing a generalized representation of the requested IDN with the stored generalized representations that represent previously registered or otherwise reserved, IDNs.

A domain name is made of code points, each with a known value assigned in Unicode. Common standards have been adopted for various languages and language variations, including, for example, traditional and simplified Chinese. According to aspects of the invention, for each code point or word-character in an IDN, all legitimate variants for a foreign language character or string of characters, such as Chinese language variants, will share the same generalized representation. Therefore, if a variant of a requested IDN is already registered, it may be recognized by the stored generalized representation in the system. By referencing the stored generalized representation, it may be determined whether a requested IDN is already covered by a registered IDN without the onerous requirements of blocking, reserving or registering all potential variants of an IDN. Aspects of the disclosed invention may also provide additional advantages, not recognized by conventional systems, of being able to accommodate mixed variations, such as Traditional and Simplified languages in a request to register the IDN or in a previously registered IDN. For example, the generalized variation may be sufficient to block all other variants, including mixed variant domains and requests.

Embodiments of the present invention relate to systems and methods for registering a domain including an IDN. Embodiments may include a method for registering a domain, including: receiving a request to register an IDN determining a language category of the request and converting code points of the request by a computer processor. Based on the converted code points a generalized variant of the IDN may be determined. The generalized variant, or portions of the generalized variant, may be compared to a stored database of registered IDNs, which may be in the form of, for example, similarly generalized variants of the registered IDNs. Embodiments may include determining whether to allow registration of the requested IDN based on whether the generalized variant matches a registered IDN, or the generalized variant of the registered IDN. For example, tithe generalized variant matches a registered IDN, or generalized variant of the registered IDN, the registration may be blocked. If the generalized variant, or portion of the generalized variant, does not match a registered IDN, or generalized variant of the registered IDN, or portion thereof, the IDN may be registered, and the generalized variant stored in the database. In embodiments, additional IDN registration requests may be blocked based on the stored generalized variant.

Embodiments may include identifying corresponding code points of variants within the language category and converting each of the code points of the requested IDN based on a deterministic algorithm applied to the corresponding code points. A deterministic algorithm may be applied to a value of each of the corresponding code points to yield at representative code point from among the corresponding code points. The generalized variant may include a representative code point for each of the code points of the request.

Embodiments may include wherein the database of registered IDNs comprises generalized variants of registered IDNs that are referenced to determine whether the generalized variant matches a registered IDN. The generalized variants of registered IDNs may be derived based on the deterministic algorithm that is applied to the corresponding code points of the requested IDN. Embodiments may include comparing a portion of the generalized variant to the stored generalized variants, and making an initial determination based on the compared portion. A portion of the generalized variant may be selected in various ways, including, for example, heuristic methods to identify statistically significant and/or insignificant characters and/or code points, or groups thereof. An initial determination may include approving the requested IDN registration, such as, for example, in the event that a partial comparison reveals no corresponding stored generalized variant. In embodiments, an inconclusive partial comparisons may be followed by additional comparisons with some additional portion, or all, of the generalized variant for the requested IDN. For example, each successive comparison may include an additional generalized character of the generalized representation, until the portion under comparison is definitively approved, or the complete string or characters is found to match a previously recorded record.

Embodiments may include applying a deterministic algorithm to a value of each of the corresponding code points to yield a representative code point from among the corresponding code points. The generalized variant may include a representative code point for each of the code points of the request. In embodiments, the deterministic algorithm may include for example at least one of identifying a corresponding code point with a smallest numerical value identifying a corresponding code point with a largest numerical value, and identifying a corresponding code point with a simplest prime factorization.

Embodiments may include, for example, the language category is Chinese and the language variants include traditional Chinese and simplified Chinese. In embodiments, the request for an IDN may include characters from at least two language variants.

Embodiments of the present invention can also include systems for implementing the described methods as well as computer-readable storage medium coded with instructions for causing a computer to execute the described methods. For example, an electronic system including a processor, a memory and an electronic communication device may be configured with programming to cause the processor to recognize a request to register an IDN; determine a language category of the request; convert code points of the request; determine a generalized variant of the IDN based on the converted code points: compare the generalized variant to a stored database of registered IDNs; and determine whether to allow registration of the IDN based on whether the generalized variant matches a registered IDN. In embodiments, systems may be configured with programming to cause the processor to identify corresponding code points of variants within the language category, and convert each of the code points of the requested IDN based on a deterministic algorithm applied to the corresponding code points, as well as the other described processes and portions thereof.

Further advantages of the present subject matter will become apparent to those of ordinary skill in the art upon reading and understanding the following detailed description of the preferred embodiments.

DETAILED DESCRIPTION OF THE INVENTION

The following detailed description is provided with reference to exemplary embodiments for the ease of description and understanding. Applicants' invention is not limited to the disclosed embodiments, and encompasses other variations that fall within the overall scope of description provided herein.

Figure 1:
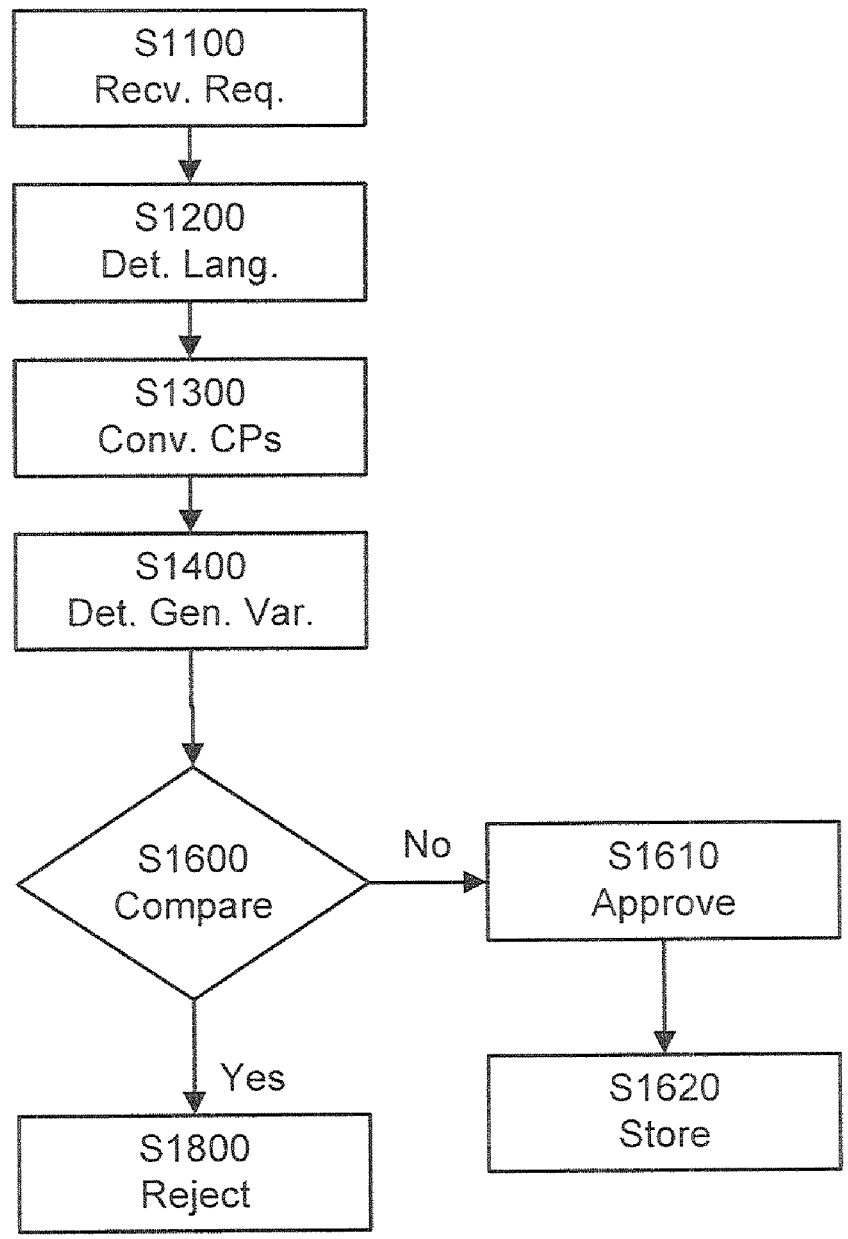
FIG. 1 depicts an exemplary method in accordance with an embodiment of the present invention.

The following exemplary method is described with reference to FIG. 1. As depicted in FIG. 1, the method may begin with step S1100, in which a request to register an IDN amy be received. The request to register the IDN may include a string of foreign language characters that may represent the requested second-level domain name with respect to a particular TLD. The request may be directed to for example a server operated by the TLD, or other appropriate authority, or may be received by some intermediary processing device or entity. Although an exemplary method is described in the context of a registry performing steps such as receiving and processing the request, it should be understood that the invention encompasses other variations which may include, for example, performing the described steps in a distributed environment including receiving, pre-processing, and evaluating aspects of the request on a requestor device or other intermediary device, and the like. The method may continue with S1200.

In S1200, a language category of the request may be determined. Determining a language category may include determining a particular category of foreign language with one or more language variants. Language variants may include, for example, different dialects, or other incidental variations in characters, that present characters that should be interpreted to correspond to one another. For the purpose of exemplary demonstration language variants of traditional Chinese and simplified Chinese are discussed further below. In the event that the language category does not include language variants, the method may process the request against a database including IDNs for that language category without Proceeding to S1300. The language category of the request may be determined in various ways including, for example identifying prepend information associated with a particular language, and/or analysis of other code points within the request that are uniquely associated with a particular language category, or language variant. As an example, the code point "521B" may be associated with a Chinese language character. Thus, the language category of the request may be determined to be Chinese language. The method may confirm that the second-level domain string contains code points from the Chinese language, and may accept different Chinese language variants within a string. If code points from other language categories, which are not recognized variants of each other, are recognized, the request may be rejected as noncompliant. The method may continue with S1300.

In S1300, code points of the request may be converted, for example by a computer processor. Converting the code points may include identifying corresponding code points of variants within the language category, and converting each of the code points of the requested IDN based on a deterministic algorithm applied to the corresponding code points. As used herein, a deterministic algorithm is intended to be understood as an algorithm that will result in a particular, or canonical result when applied to various corresponding code points representing a group of associated characters. For example, as discussed above, ACE code points for language variants may contain values such as "521B", "521B", "5275", "5259", "5231" etc. Such values may be processed by a determinative algorithm to yield a particular result, which may be, for example, a lowest numerical value of the numerical portions of the strings. A detailed exemplary method is described below.

Assume that the characters within the following groups are semantically equivalent in a given language category, in this case Chinese. That is, all of the characters in Group A are semantically equivalent to each other, all of the characters in Group B are semantically equivalent to each other, and so on.
Group A 创 創 刱 剏
Group B 别 彆 別 憋
Group C 划 刬 剗
Group D 刮 劀 劋

By application of a determinative algorithm, exactly one character from each group is deterministically and uniquely identified as the canonical representation of the group. This could be the character with the smallest numerical Unicode representation, the largest numerical Unicode representation, or other deterministic evaluations such as, for example, the character with the simplest prime factorization. To illustrate the concept by way of Further example, assume that the Unicode character points for the above symbols are as
Group A: 521B; 5275; 5259; 5231
Group B: 522B; 5F46; 5225; 618B
Group C: 522C; 5257; 5277
Group D: 522B; 98B3; 5280

By applying a deterministic algorithm, in this case a lowest numerical value of the corresponding code points above representative code points may be determined, as follows:
Group A 521B (创)
Group B 522B (别)
Group C 522C (划)
Group D 522E (刮)

As indicated above, other deterministic algorithms may be applied that yield a canonical representation for each group.

Returning to S1300, converting the code points of a requested IDN may include identifying corresponding code points of variants within the language category, and converting each of the code points of the requested IDN based on a deterministic algorithm applied to the corresponding code points. Thus, for example, a "Code Point 1" in an IDN request may be evaluated and found to correspond to code points identified in "Group A". A deterministic algorithm may be applied to the corresponding code points in Group A, in this case a rule that chooses the lowest numerical value, to yield a representative code point for "Code Point 1."
Code Point 1 5275 (創)
Group A: 521B; 5275; 5259; 5231
Representative 1 521B (创)

In practice, the deterministic algorithm need not be performed each time a particular IDN request is processed. The deterministic algorithm may be applied beforehand and the representative code points predetermined such that, at the time of the request, code points in the request can be converted to their respective representative values by identifying the group of code points that the requested code point is included in, and applying the predetermined representative code point for the group. The method may continue with S1400.

In S1300, a generalized variant of the IDN may be determined based on the converted code points. The generalized variant may include a representative code point for each of the code points of the request. For example, as shown below, Domains Y and Z may each be converted to a generalized variant by converting each of the code points based on a deterministic algorithm.
Domain Y 創別刬劋 → 创别划刮
Domain Z 刱別剗劀 → 创别划刮

As can be seen in the example, characters in each of the code points for Domain Y and Domain Z are from corresponding groups of characters, e.g. Code Point 1 characters are from Group A, Code Point 2 characters are from Group B, etc. Thus, Domains Y and Z result in the same generalized variant. By converting each of the code points based on the deterministic algorithm, and comparing, the results of the conversion, correspondence of the domains may be established. Additionally, as demonstrated above, disclosed embodiments are able to accommodate mixed variants of language category, such as Traditional and Simplified Chinese in a request to register the IDN or in a previously registered IDN. That is the generalized variant is sufficient to block all other variants within the language category, regardless of mixed variants in the previously registered IDN or the IDN request. The method may continue with S1600.

In S1600, the generalized variant may be compared to a stored database of registered IDNs. The stored database of registered IDNs may be in the form of for example similarly generalized variants of the registered IDNs, which may then be considered "registered IDNs" themselves. S1600 may operate as a determining step as to whether to allow registration of the requested IDN based on whether the generalized variant matches a registered IDN or the generalized variant of the registered IDN. If it is determined that the generalized variant matches a registered IDN, or generalized variant of the registered IDN, the method may proceed to S1800.

In S1800, a reject result may be returned, which may indicate that the requested IDN is not available for registration. The reject result may be communicated to a requester in the form of a denial to register the requested IDN.

Returning to S1600 if the generalized variant does not match a registered IDN, or generalized variant of the registered IDN, the method may proceed to S1610.

In S1610, an approve result may be returned, which may indicate that the requested IDN is available for registration. The approve result may be communicated to a requester in the form of an offer to register the requested IDN. The transaction may be concluded by the requestor accepting the registration offer, such as by paying a fee or other wise obligating themselves and the registry, or other competent authority approving the transaction and effectuating registration of the IDN. The method may continue with S1620.

In S1620, the generalized variant of the requested IDN may be stored in the IDN database. In embodiments, additional IDN registration requests may then be blocked based on the newly-stored generalized variant.

Figure 2:
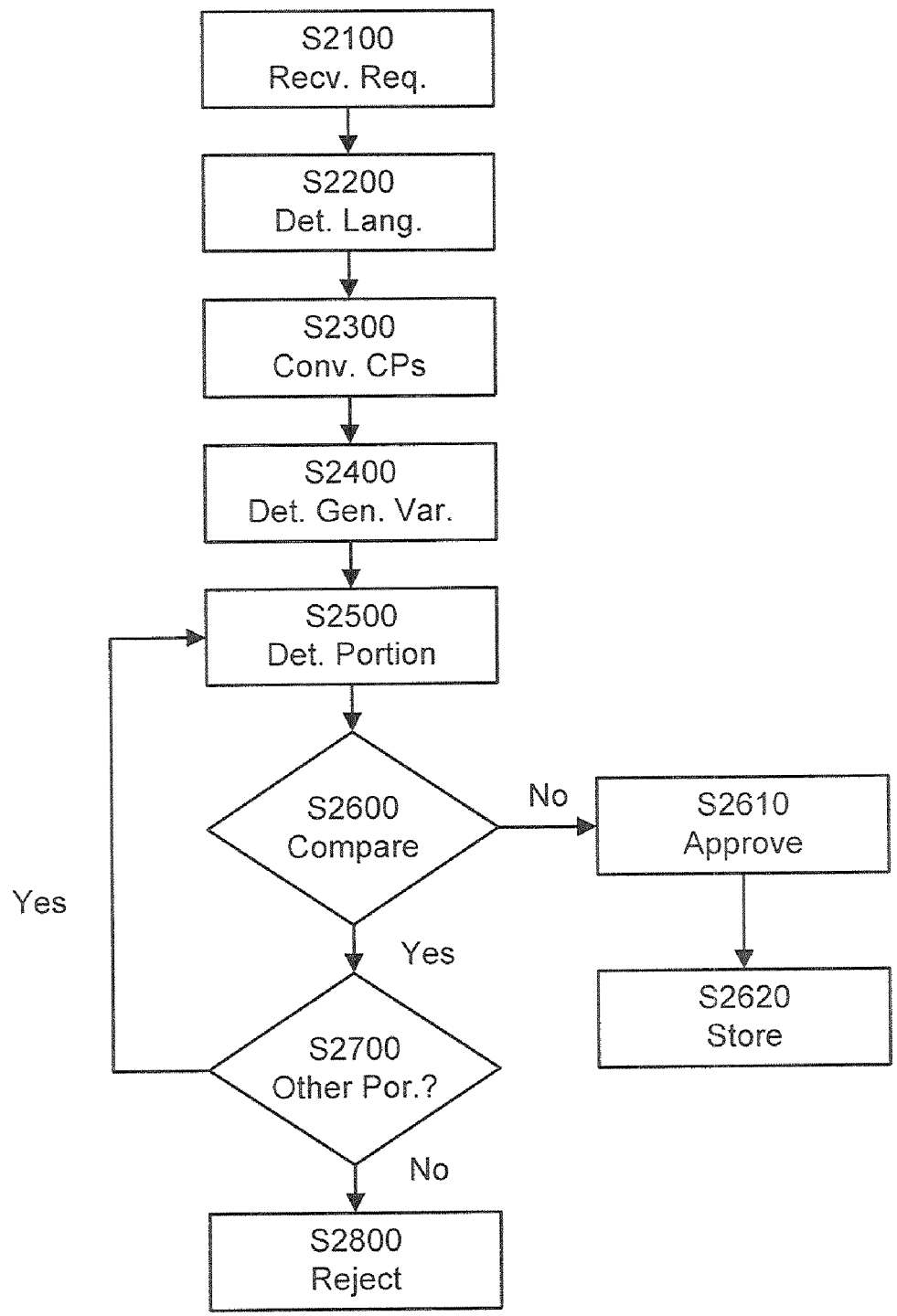
FIG. 2 depicts an exemplary method in accordance with an embodiment of the present invention.

A second exemplary method is described with reference to FIG. 2. In the embodiment depicted in FIG. 2, determinations and comparisons may be made based on portions of the requested IDN. Thus, the determination on whether to allow registration of the requested IDN may be based on whether a portion of the generalized variant matches. For example a corresponding portion of a registered IDN, or the generalized variant of the registered IDN. As depicted in FIG. 2, the method may begin with step S2100 and proceed to S2400 in similar manner to S1100 through S1400 depicted in FIG. 1 and described above. The method may continue with S2500.

In S2500, a portion of the requested IDN, or portion of the generalized variant of the requested IDN may be determined. The portion of the IDN or generalized variant may include, for example, a single code point or a group of code points. The portion of the IDN or generalized variant may be selected in various ways, including, for example, heuristic methods to identify statistically significant and/or insignificant characters. Such methods may identify statistically significant characters, such as those that rarely occur in the particular language category and that have a relatively low probability of occurring in other previously registered IDNs. By checking such code points first, it may be unnecessary to convert, and/or search the IDN database based on the full string of the requested IDN, which may be more efficient in certain circumstances. Thus, although S2300 through S2400 are depicted in exemplary manner in FIG. 2 as preceding S2500, it is possible to determine the relevant portion of the requested IDN before conversion and/or determination of the generalized variant. Other methods of determining the portion of the IDN, or generalized variant may include designating specific code points and/or or groups thereof, such as, for example, serially etc. The method may continue with S2600.

In S2600, the portion of the requested IDN, or portion of the generalized variant of the requested IDN, may be compared to a stored database of registered IDNs. As discussed above the stored database of registered IDNs may be in the form of, for example, similarly generalized variants of the registered IDNs, which may then be considered "registered IDNs" themselves. S2600 may operate as a determining step as to whether to allow registration of the requested IDN based on whether portion of the requested IDN, or portion of the generalized variant of the requested IDN, matches a corresponding portion of a registered IDN or portion of the generalized variant of the registered IDN. For example, a portion of the generalized variant of the IDN may be identified as occupying a particular position in the IDN string. This portion may be compared to portions occupying a similar position in relevant IDN strings stored in the IDN database. Relevant strings in the database may be identified by numbers of code points, hash tables, and the like. If it is determined that the portion of the requested IDN, or portion of the generalized variant of the requested IDN, does not match a corresponding portion of the relevant strings stored in the IDN database, the method may proceed to S2610.

In S2610, an approve result may be returned, which may indicate that the requested IDN is available for registration. The approve result may be communicated to a requestor lit the boo of an offer to register the requested IDN. The transaction may be concluded by the requestor accepting the registration offer, such as by paying a fee or other wise obligating themselves, and the registry, or other competent authority approving the transaction and effectuating registration o the IDN. The method may continue with S2620.

In S2620, the generalized variant of the requested IDN may be stored in the IDN database. In embodiments in which the full IDN was not previously converted to a generalized variant, S2620 may include converting each code point of the requested IDN to determine the generalized variant. In embodiments, additional IDN registration requests may then be blocked based on the newly-stored generalized variant.

Returning to S2600, if it is determined that the portion of the requested IDN, or portion of the generalized variant of the requested IDN, matches a corresponding portion of the relevant strings stored in the IDN database, the method may proceed to S2700.

In S2700, it may be determined if other portions of the requested IDN, or other portions of the generalized variant of the requested IDN, have not yet been included in the comparison of S2600. If it is determined that there are portions of the requested IDN, or portions of the generalized variant of the requested IDN, that have not been included in the comparison the method may return to S2500 in order to determine an additional portion of the requested IDN or portions of the generalized variant of the requested IDN, to compare with the database. In S2500, an additional portion may be determined and added to the search string used to compare the requested IDN with the database. Alternatively, the newly identified portion may be used independently to perform a new comparison in S2600. That is, for example, an initial search string including portion "A" may be added upon to include additional component "B" (A+B+n . . . ) or each portion can be used for a discrete search search A then search B, then search n . . . ). In either event, the method may continue to perform comparisons via S2600 until it is determined that there is no match to the current comparison or there are no more portions to add to the comparison.

Returning, to S2700, if it is determined that there are no portions of the requested IDN, or portions of the generalized variant of the requested IDN, that have not been included in the comparison (i.e. all of the portions have been compared against the database), the method may proceed to S2800.

In S2800, a reject result may be returned, which may indicate that the requested IDN is not available for registration. S2800 may reflect a state in which all portions of the requested IDN, or portions of the generalized variant of the requested IDN, have been included in the comparison and a match has been found in the database. That is, all of the code points of the requested IDN are represented in a registered IDN. The reject result may be communicated to a requestor in the form of a denial to register the requested IDN.

Figure 3:
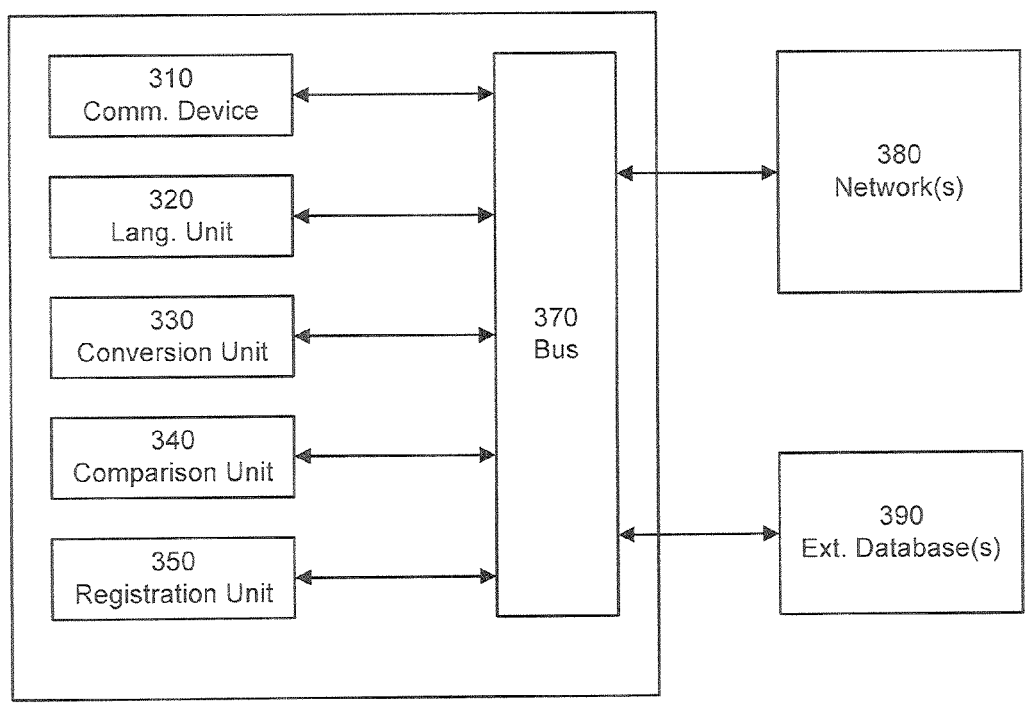
FIG. 3 depicts an exemplary system in accordance with en embodiment of the present invention.

An exemplary system is described with reference to FIG. 3. In the embodiment depicted in FIG. 3, a domain name registration system 300 may include a communication device 310, a language unit 320, a conversion unit 330, a comparison unit 340, and a registration unit 350, interconnected by a bus 370. Described components of system 300 may be implemented as hardware, associated storage medium with particularized programming embedded thereon, and combinations thereof. It should also be noted that although depicted for case of description as interconnected by bus 370 and parts of system 300, within the scope of the invention, the described units may be distributed among different physical devices to perform similar functionality as described herein.

In embodiments, the communication device 310 may be configured to receive and recognize a request to register an IDN. The communication device 310 may include or be configured to communicate with, wired, optical, electronic and other known communication devices to exchange in formation between the system 300 and a network 380 and/or external database 390.

In embodiments, the language unit 320 may be configured to determine a language category of the request. This may include particular programming, that parses the request to identify prepend, or other code point information, that corresponds to a language category.

In embodiments, the conversion unit 320 may be configured to convert code points of the request, such as, for example, including particular programming to cause a computer processor to identify corresponding code points, e.g. identify a group of corresponding code points, of variants within the language category, and convert each of the code points of the requested IDN to a representative code point that is based on a deterministic algorithm applied to the corresponding code points. For example, a table of the groups of corresponding code points and the canonical representative for the group may be stored in a local or remote data storage device accessible by the conversion unit 330. The conversion unit 330 may submit a query including all, or some of, the code points of the requested IDN and receive the canonical representative code points for each of the code points submitted. Other methods of accessing such data, and converting the code points to the representative values within the scone of the invention will be appreciated by those of skill in the art upon reading the full disclosure herein.

In embodiments, the conversion unit 330 may be configured to determine a generalized variant of the requested IDN based on the converted codepoints. The conversion unit 330 may also be configured to identify particular portions of the requested IDN, or generalized variant of the requested IDN, for later processing. For example, conversion unit 330 may be configured to apply heuristic rules that identify significant codepoints within the requested IDN, or generalized variant of the requested IDN, that may be prioritized over other portions or the requested IDN for comparison purposes.

In embodiments, the comparison unit 340 may be configured to compare the generalized variant to a stored database of registered IDNs, and determine whether to allow registration of the IDN based on whether the generalized variant matches a registered IDN, or a generalized variant of a registered IDN. The comparison unit 340 may access a local storage unit, or external database 390 in order to perform the comparison. For example, a centralized authoritative database may be maintained with generalized variants of all of a TLD's registered IDNs stored therein. Any number of requesting, or intermediary, systems 300 may access the database with queries for requested IDNs and receive authoritative responses. As described above, the comparison unite may be configured to process an individual request in an iterative manner in conjunction with the conversion unit, by comparing portions of a requested IDN, or portion of a generalized variant of the IDN against the IDN database. In the case of a negative result, a requested IDN may be approved. In the case of an affirmative match for a portion of the IDN, any remaining portions of the IDN may be compared against the database, until a negative response is returned or all portions of the IDN have been compared against the database. The comparison unit may be configured to initiate communications, e.g. via the communication device 310 that report the results of the comparison to a requesting user, intermediary and the like.

In embodiments, the registration unit may be configured to effectuate the registration of an approved IDN. This may include completing a registration transaction with a requesting user, and, if the operator of system 300 has the appropriate authority, registering the IDN with a registry. In embodiments, an intermediary may be performing parts of the described method with an appropriately configured device. For example, an intermediary, or client-side machine, may be configured to perform initial processing of IDN requests such as determining the language category, converting the code points of the requested IDN to a generalized variant of the requested IDN, and/or sending a comparison request to a TLD server. In such cases, the intermediary, or client-side, device may be configured to effectuate registration of the approved IDN by sending an appropriately approved confirmation to the TLD authority after all necessary comparisons, approvals and transactions have been concluded.

Figure 4:
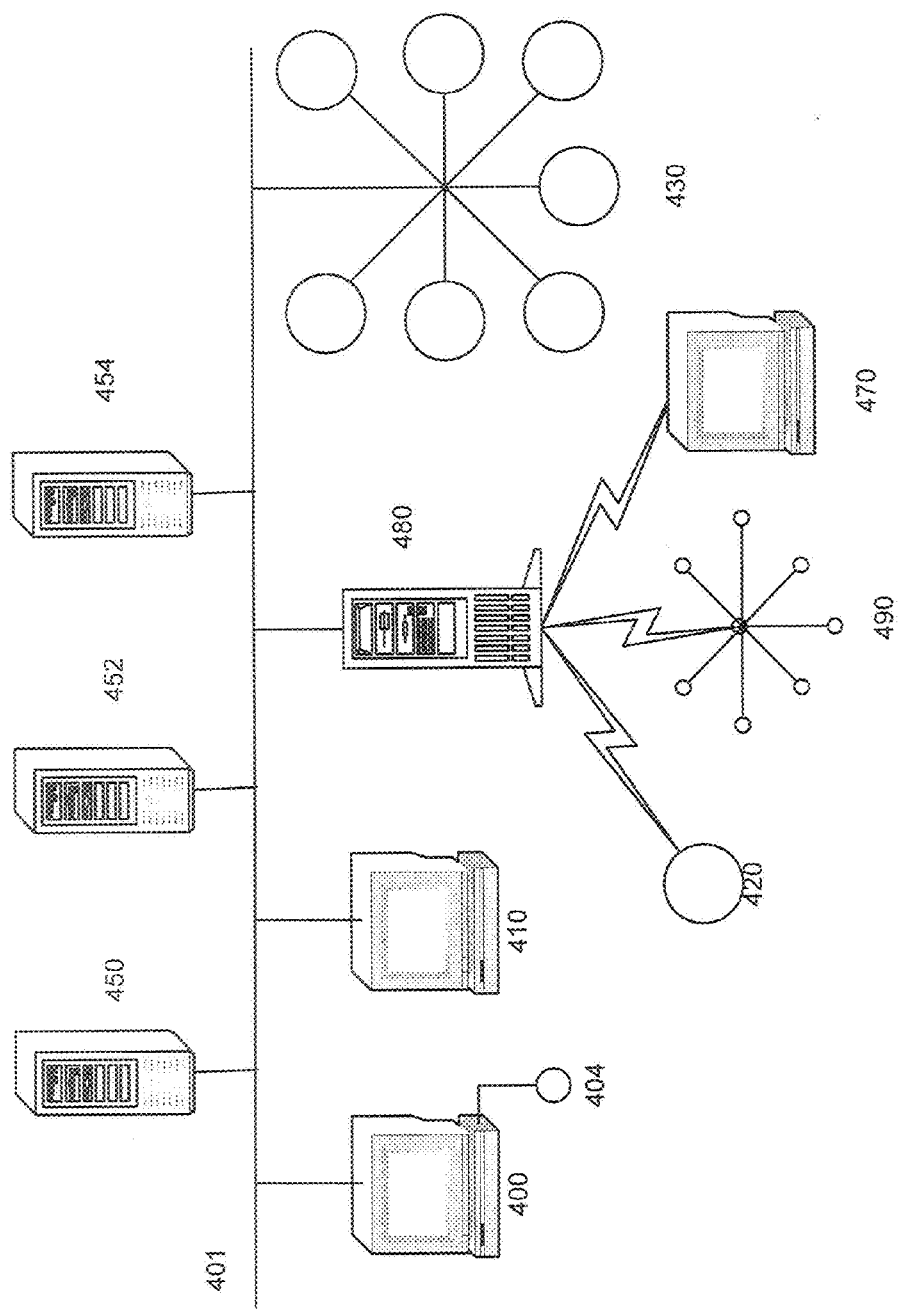
FIG. 4 depicts an exemplary network-based system in accordance with an embodiment of the present invention.

Embodiments of the present invention can include various configurations and systems for implementing the described methods, as well as computer-readable storage medium coded with instructions for causing a computer to execute the described methods. For example, as shown in FIG. 4, an electronic system 400 including a processor, a memory and an electronic communication device may be configured to initiate, forward, and/or receive a request to register an IDN to a DNS server, e.g. 450. The system 400 may represent a user computer system, wireless communication devices such as 420, 470, subnetworks such as 430, 490, a server, or any other network-capable device with the requisite functional capabilities. System 400 may operate as an intermediary to a DNS server associated with a registry supporting IDN.

The system 400 includes any number of processors (not shown) that are coupled to storage devices including a first storage (not shown, typically a random access memory, or "RAM"), second storage (not shown, typically a read only memory or "ROM"). Both of these storage devices may include any suitable type of the computer-readable media described and/or mentioned above. A mass storage device (not shown) may also be used to store programs, data and the like and is typically a secondary storage medium, such as a hard disk that is slower than primary storage. It will be appreciated that the information retained within the mass storage device may, in appropriate cases, be incorporated in standard manner as part of primary storage as virtual memory. A specific mass storage device such as a CD-ROM may also pass data uni-directionally to the processor.

The system 400 may also include an interlace that includes one or more input/output devices such as such as video monitors, track balls, mice 404, keyboards, microphones, touch-sensitive displays, transducer card readers, magnetic or paper tape readers, tablets, styluses, voice or handwriting recognizers, or other known input devices, including other appropriately linked computers 410. In embodiments, the system 400 may be configured to receive a user request to register an IDN via the various input devices. The system 400 may be coupled to a computer or other electronic communication network 470, 480 using a network connection as shown generally at 401. The network can connect various wired optical electronic and other known networks to exchange information among computers 410, servers 450, 452, 454, 480, wireless communication devices 420, 470 and sub-networks 490, 430. With such a network connection, it is contemplated that the system 400 and the processor(s) therein may receive information from the network, or may output information to the network in the course of performing the above-described method steps. For example, a request to register an IDN may be forwarded from a system 400 to a registry server 450 via network 401. In embodiments, network server 450 may access information stored in another server or data source 452 in order to for example, convert or compare the contents of request. After the request is evaluated, a response may be sent from the registry server 450 to the system 400 via network 401, or other means. The above-described devices and materials will be familiar to those of skill in the computer hardware and software arts and need not be individually or exhaustively depicted to be understood by those of skill in the art. The hardware elements described above may be configured to act as one or more units for performing the operations described above.

In addition, embodiments of the present invention further include computer-readable storage media that include program instructions for performing various computer-implemented operations of the described methods. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that my be executed by the computer using an interpreter.

The invention has been described with reference to exemplary embodiments. Modifications and alterations of the described embodiments may be evident to those of ordinary skill in the art upon a reading and understanding of this specification. The present invention is intended to include all such modifications and alterations insofar as they come within the scope of the appended claims, or the equivalents thereof.

What is claimed is:

1. A method for registering a domain, comprising:
   receiving a request to register an Internationalized Domain Name (IDN) at a registry server;
   determining a language category of the request;
   identifying corresponding code points of language variants within the language category for one or more code points in the request;
   converting each of the one or more code points into a representative code point chosen from among the corresponding code points by applying a deterministic algorithm to a value of each of the corresponding code points;
   determining, by a computer processor, a generalized variant of the IDN based on the converted code points;
   comparing a portion of the generalized variant to a stored database of registered IDNs;
   if the portion of the generalized variant matches a portion of a registered IDN, comparing another portion of the generalized variant to the stored database of registered IDNs;
   if all portions of the generalized variant match a registered IDN, blocking the registration; and
   if at least one portion of the generalized variant does not match a portion of a registered IDN, registering the IDN and storing the generalized variant in the database.

2. The method of claim 1, wherein the generalized variant includes a representative code point for each of the code points of the request.

3. The method of claim 1, wherein the deterministic algorithm includes identifying a corresponding code point with a smallest numerical value.

4. The method of claim 1, wherein the deterministic algorithm includes identifying a corresponding code point with a largest numerical value.

5. The method of claim 1, wherein the deterministic algorithm includes identifying a corresponding code point with a simplest prime factorization.

6. The method of claim 1, further comprising blocking additional IDN registration requests based on the stored generalized variant.

7. The method of claim 1, wherein the language category is Chinese and the language variants include traditional Chinese and simplified Chinese.

8. The method of claim 1, wherein the request includes characters from at least two language variants.

9. The method of claim 8, wherein the deterministic algorithm includes identifying a corresponding code point based on numerical values of each of the corresponding code points.

10. The method of claim 8, wherein the deterministic algorithm includes identifying a corresponding code point with a smallest numerical value.

11. The method of claim 8, wherein the deterministic algorithm includes identifying a corresponding code point with a largest numerical value.

12. The method of claim 8, wherein the deterministic algorithm includes identifying a corresponding code point with a simplest prime factorization.

13. A computer-readable storage device encoded with executable instructions that, when executed by a computer, cause the computer to perform the steps of:
   recognizing a request to register an Internationalized Domain Name (IDN) at a registry server;
   determining a language category of the request;
   identifying corresponding code points of variants within the language category for one or more code points in the request;
   converting each of the one or more code points into a representative code point chosen from among the corresponding code points by applying a deterministic algorithm to a value of each of the corresponding code points;
   determining a generalized variant of the IDN based on the converted code points;
   comparing a portion of the generalized variant to a stored database of registered IDNs;
   if the portion of the generalized variant matches a portion of a registered IDN, comparing another portion of the generalized variant to the stored database of registered IDNs;

if all portions of the generalized variant match a registered IDN, blocking the registration; and if at least one portion of the generalized variant does not match a portion of a registered IDN, registering the IDN and storing the generalized variant in the database.

14. The device of claim 13, wherein the generalized variant includes a representative code point for each of the code points of the request.

15. A method for registering a domain, comprising:

receiving a request to register an Internationalized Domain Name (IDN);

determining a language category of the request;

identifying corresponding code points of variants within the language category for one or more code points in the request;

converting each of the one or more code points into a representative code point chosen from among the corresponding code points by applying a deterministic algorithm to a value of each of the corresponding code points;

determining, by the computer processor, a generalized variant of the IDN based on the converted code points;

comparing a portion of the generalized variant to a stored database of registered IDNs; and determining, by the computer processor, whether to allow registration of the IDN based on whether the portion of the generalized variant matches a portion of a registered IDN;

wherein, if the IDN is not allowed to register, the comparing step is repeated with another portion of the generalized variant.

16. The method of claim 15, wherein the generalized variant includes a representative code point for each of the code points of the request.

17. The method of claim 15, wherein the database of registered IDNs comprises generalized variants of registered IDNs that are referenced to determine whether the generalized variant matches a registered IDN, the generalized variants of registered IDNs derived based on the deterministic algorithm.

18. The method of claim 17, wherein the deterministic algorithm includes identifying a corresponding code point with a smallest numerical value.

19. The method of claim 17, wherein the deterministic algorithm includes identifying a corresponding code point with a largest numerical value.

20. The method of claim 18, wherein the deterministic algorithm includes identifying a corresponding code point with a simplest prime factorization.

21. A system for registering a domain, comprising:

a memory; and a computer processor, wherein the memory is encoded with instructions that cause the computer processor to perform the following steps:

recognizing a request to register an Internationalized Domain Name (IDN);

determining a language category of the request;

identifying at least one code point that is included in a group of corresponding code points;

replacing the at least one code point with a representative code point, the representative code point chosen from among the group of corresponding code points by applying a deterministic algorithm to a value of each of the corresponding code points;

determining a generalized variant of the IDN based on the converted code points;

comparing a portion of the generalized variant to a stored database of registered IDNs; and determining whether to allow registration of the IDN based on whether the portion of the generalized variant matches a portion of a registered IDN:

wherein, if the IDN is not allowed to register, the comparing step is repeated with another portion of the generalized variant.

* * * * *